United States Patent
Yang et al.

(10) Patent No.: US 8,774,623 B2
(45) Date of Patent: Jul. 8, 2014

(54) PASSIVE OPTICAL NETWORK SYSTEM AND METHOD FOR DETECTING FAULT IN OPTICAL NETWORK TERMINAL

(75) Inventors: Shin Hak Yang, Gwacheon-si (KR); Young Seok Yang, Seoul (KR); Jae Kug Kim, Seoul (KR)

(73) Assignee: Ubiquoss Inc., Seoul (KR)

( * ) Notice: Subject to any disclaimer, the term of this patent is extended or adjusted under 35 U.S.C. 154(b) by 45 days.

(21) Appl. No.: 13/536,143

(22) Filed: Jun. 28, 2012

(65) Prior Publication Data

US 2013/0004156 A1   Jan. 3, 2013

(30) Foreign Application Priority Data

Jun. 30, 2011  (KR) .................. 10-2011-0065035
Jul. 21, 2011  (KR) .................. 10-2011-0072536

(51) Int. Cl.
     *H04B 10/08*  (2006.01)
(52) U.S. Cl.
     USPC .............. 398/17; 398/38; 398/66; 398/70; 398/98
(58) Field of Classification Search
     CPC ........... H04B 10/07955; H04B 10/0793; H04B 10/0795; H04B 10/079; H04Q 11/0067; H04J 3/1694
     USPC ......... 398/10, 17, 38, 66, 67, 98, 99, 100, 70, 398/71
     See application file for complete search history.

(56) References Cited

U.S. PATENT DOCUMENTS

| | | | |
|---|---|---|---|
| 6,967,949 B2 * | 11/2005 | Davis et al. | 370/390 |
| 7,664,019 B2 * | 2/2010 | Boyd et al. | 370/230 |
| 8,335,235 B2 * | 12/2012 | Davis et al. | 370/474 |
| 8,358,929 B2 * | 1/2013 | Lewis et al. | 398/19 |
| 8,442,398 B2 * | 5/2013 | Li et al. | 398/16 |
| 8,532,482 B2 * | 9/2013 | Yang | 398/17 |
| 8,582,966 B2 * | 11/2013 | Chen | 398/5 |
| 2005/0041682 A1 * | 2/2005 | Kramer | 370/458 |
| 2005/0058118 A1 * | 3/2005 | Davis et al. | 370/351 |
| 2005/0100036 A1 * | 5/2005 | Davis | 370/432 |
| 2006/0268759 A1 * | 11/2006 | Emery et al. | 370/321 |
| 2007/0183793 A1 * | 8/2007 | Zhao et al. | 398/212 |
| 2008/0198857 A1 * | 8/2008 | Kim et al. | 370/401 |
| 2008/0232819 A1 * | 9/2008 | Mukai | 398/168 |
| 2009/0104878 A1 * | 4/2009 | Fujimura | 455/67.11 |
| 2013/0236178 A1 * | 9/2013 | Garavaglia et al. | 398/67 |
| 2013/0251362 A1 * | 9/2013 | Li et al. | 398/25 |

* cited by examiner

*Primary Examiner* — Daniel Washburn
*Assistant Examiner* — Hibret Woldekidan
(74) *Attorney, Agent, or Firm* — Levenfeld Pearlstein, LLC

(57) ABSTRACT

Disclosed herein is a Passive Optical Network (PON) system and method for detecting a fault in an Optical Network terminal (ONT). The PON system for detecting a fault in an ONT includes a plurality of ONTs for outputting optical signals in time slots allocated thereto in a time division access control manner and having at least one virtual ONT. An Optical Line Terminal (OLT) receives the optical signals output from the plurality of ONTs in the time division access control manner, and then detects a faulty ONT.

According to the present invention, a faulty ONT that continuously outputs signals can be detected and action can be rapidly taken against system faults when a virtual ONT is formed in a plurality of ONTs connected to an OLT and then an optical signal in the section of the virtual ONT is detected, thus providing a reliable service.

10 Claims, 9 Drawing Sheets

PASSIVE OPTICAL NETWORK SYSTEM AND METHOD FOR DETECTING FAULT IN OPTICAL NETWORK TERMINAL

This application claims the benefit of Korean Patent Application Nos. 10-2011-0065035 filed on Jun. 30, 2011 and 10-2011-0072536 filed on Jul. 21, 2011, which are hereby incorporated by reference in their entirety into this application.

BACKGROUND OF THE INVENTION

1. Field of the Invention

The present invention relates, in general, to a Passive Optical Network (PON) system and method for detecting a fault in an Optical Network Terminal (ONT) and, more particularly, to a PON system and method for detecting a fault in an ONT, which can detect a faulty ONT that continuously outputs signals, or which can determine whether a faulty ONT is present by applying a trigger signal and detecting a Loss Of Signal (LOS) signal corresponding to the trigger signal when a virtual ONT is formed in a plurality of ONTs connected to an Optical Line Terminal (OLT) and then an optical signal in the section of the virtual ONT is detected.

2. Description of the Related Art

Recently, as the number of Internet users who use wireless communication rapidly increases, high-speed Internet technologies have been developed so as to provide faster Internet services to users.

A representative technology for typical high-speed Internet services is wireless Local Area Network (LAN) technology.

Optical communication systems are systems for transmitting and receiving data based on optical signals. A station-side optical line terminal is a device for relaying the transmission of data between a server that provides various types of data services to subscribers over a telephone network or the Internet, and optical network terminals that are connected to respective subscriber terminals. The optical line terminal forms optical signals required to transmit the transmission data of the server to a target optical network terminal and receive data transmitted from the target optical network terminal.

Typically, a Passive Optical Network (PON) is one of optical subscriber construction schemes for providing an optical fiber-based high-speed service to businesses or normal homes, and is configured such that Optical Network Terminals (ONTs) disposed downstream of the PON can be connected to the PON by using a splitter in an optical cable. In this case, a Time Division Multiplexing (TDM)-PON using a TDM scheme allocates or distributes downstream optical signals to subscribers and combines upstream optical signals received from subscribers.

In such a TDM-PON, the transmission and reception of data between an OLT and ONTs are conducted in such a way that, in the case of a downstream procedure, when the OLT inserts the identifier of a registered ONT into the preamble of a frame and transmits the frame, a relevant ONT sends only a frame having its own identifier to a user interface. In contrast, in the case of an upstream procedure, when the OLT dynamically allocates upstream time slots to all ONTs, the ONTs transmit data to the OLT in respective time slots allocated thereto.

In this case, the ONTs must perform the upstream procedure only in the allocated time slots. However, when a fault occurs in any one of ONTs and then the faulty ONT continuously transmits signals, a problem with the overall communication may occur.

SUMMARY OF THE INVENTION

Accordingly, the present invention has been made keeping in mind the above problems occurring in the prior art, and an object of the present invention is to provide a PON system and method for detecting a fault in an ONT, which can detect a faulty ONT that continuously outputs signals when a virtual ONT is formed in a plurality of ONTs connected to an OLT and then an optical signal in the section of the virtual ONT is detected.

Another object of the present invention is to provide a PON system and method for detecting a fault in an ONT, in which a virtual ONT is formed in a plurality of ONTs connected to an OLT and which apply a trigger signal to the ONTs and detect a LOS signal corresponding to the trigger signal, thus determining whether a faulty ONT is present.

Technical objects of the present invention are not limited to the above-described objects, and other objects that are not described will be more clearly understood by those skilled in the art from the following detailed description taken in conjunction with the accompanying drawings.

In accordance with an aspect of the present invention to accomplish the above objects, there is provided a Passive Optical Network (PON) system for detecting a fault in an Optical Network Terminal (ONT), including a plurality of ONTs for outputting optical signals in time slots allocated thereto in a time division access control manner and having at least one virtual ONT; and an Optical Line Terminal (OLT) for receiving the optical signals output from the plurality of ONTs in the time division access control manner, and detecting an optical power level in a time slot allocated to the virtual ONT, thus determining whether a faulty ONT is present.

Preferably, the OLT may include a Microcontroller (MCU) for allocating unique Logical Link Identifiers (LLIDs) and a Virtual Logical Link ID (V-LLID) to the plurality of ONTs and the virtual ONT, respectively; an optical reception unit for receiving the optical signals from the ONTs; a photoelectric conversion unit for converting the optical signals received from the optical reception unit into electrical signals; an optical monitoring unit for converting the signals, which have been converted into the electrical signals by the photoelectric conversion unit, into digital signals, and then detecting optical power; a database (DB) unit for storing data about optical power of the ONTs; and a control unit for allocating time slots in accordance with respective time schedules of the ONTs, comparing the optical power data detected by the optical monitoring unit with the optical power data of the DB unit, and then determining whether a faulty ONT is present.

Preferably, the control unit may determine whether a faulty ONT is present depending on whether an optical signal has been detected in the time slot allocated to the virtual ONT.

Preferably, if an optical power level of the optical signal detected in the time slot allocated to the virtual ONT is equal to or greater than a predetermined value, it may be determined that a faulty ONT is present.

Preferably, the virtual ONT may be formed at every Nth position of a sequence in which the ONTs are sequentially arranged.

In accordance with another aspect of the present invention to accomplish the above objects, there is provided a Passive Optical Network (PON) system for detecting a fault in an Optical Network Terminal (ONT), including a plurality of ONTs for outputting optical signals in time slots allocated thereto in a time division access control manner and having at least one virtual ONT; and an Optical Line Terminal (OLT) for receiving the optical signals output from the plurality of ONTs, and determining whether a Loss Of Signal (LOS) signal corresponding to a trigger signal in a time slot of the virtual ONT is present, thus detecting whether a faulty ONT is present.

Preferably, the OLT may include a Microcontroller (MCU) for allocating unique Logical Link Identifiers (LLIDs) and a Virtual Logical Link ID (V-LLID) to the plurality of ONTs and the virtual ONT, respectively; an optical reception unit for receiving the optical signals from the ONTs and the virtual ONT; a fault signal detection unit for determining whether a Loss of Signal (LOS) signal is present in the time slot of the virtual ONT; and a PON unit for applying a trigger signal to the fault signal detection unit in the time slot of the virtual ONT, and determining whether a faulty ONT is present depending on whether the LOS signal has been detected by the fault signal detection unit.

Preferably, the fault signal detection unit may determine the time slot of the virtual ONT in response to the trigger signal applied by the PON unit.

Preferably, the PON unit may determine that a faulty ONT is present if that the LOS signal has been detected by the fault signal detection unit, and determines that the ONTs are normal if the LOS signal has not been detected.

Preferably, the PON unit may determine that a faulty ONT is present if an optical power level of the virtual ONT detected by an optical power detection unit is equal to or greater than a predetermined value.

Preferably, the PON system may further include a photoelectric conversion unit for converting the optical signals received from the optical, reception unit into electrical signals; an optical power detection unit for converting the signals, which have been converted into the electrical signals by the photoelectric conversion unit, into digital signals, and detecting optical power levels of the ONTs and the virtual ONT in response to the trigger signal applied by the PON unit; and a database (DB) unit for storing data about the optical power levels of the ONTs and the virtual ONT detected by the optical power detection unit.

In accordance with a further aspect of the present invention to accomplish the above objects, there is provided a method for detecting a fault in an Optical Network Terminal (ONT) in a Passive Optical Network (PON) system, including allocating unique Logical Link Identifiers (LLIDs) and a Virtual LLID (V-LLID) to a plurality of ONTs and at least one virtual ONT, respectively; setting time slots for the individual ONTs and the virtual ONT so that optical signals are output from the ONTs and the virtual ONT in a time-division access control manner; detecting an optical signal in a time slot allocated to the virtual ONT; and determining that a faulty ONT is present among the ONTs if an optical power level of the optical signal detected in the time slot allocated to the virtual ONT is equal to or greater than a predetermined value.

Preferably, the time slot of the virtual ONT may be formed at every Nth position of a sequence in which the time slots of the ONTs are sequentially arranged.

In accordance with yet another aspect of the present invention to accomplish the above objects, there is provided a method for detecting a fault in an Optical Network Terminal (ONT) in a Passive Optical Network (PON) system, including allocating unique Logical Link Identifiers (LLIDs) and a Virtual LLID (V-LLID) to a plurality of ONTs and at least one virtual ONT, respectively; setting time slots for the individual ONTs and the virtual ONT so that optical signals are output from the ONTs and the virtual ONT in a time-division access control manner; applying a trigger signal in the time slot of the virtual ONT; receiving optical signals from the ONTs and the virtual ONT, and detecting whether a Loss of Signal (LOS) signal is present in the time slot in which the trigger signal has been applied; and determining that a faulty ONT is present among the ONTs if the LOS signal has been detected.

Preferably, the method may further include converting the received optical signals into electrical signals; converting the electrical signals into digital signals and detecting optical power levels of the ONTs and the virtual ONT in response to the applied trigger signal; storing data about the detected optical power levels of the ONTs and the virtual ONT; and determining that a faulty ONT is present if the detected optical power level of the virtual ONT is equal to or greater than a predetermined value.

Preferably, the method may further include detecting LOS signals of the ONTs and the virtual ONT in response to the applied trigger signal.

DESCRIPTION OF THE PREFERRED EMBODIMENTS

Figure 1:
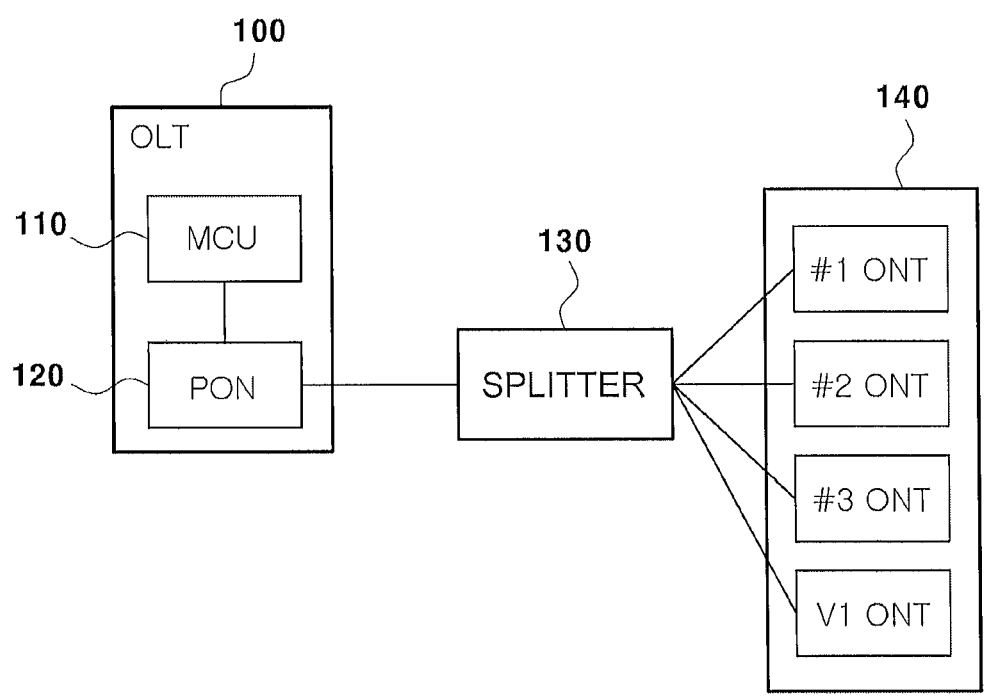
FIG. 1 is a diagram schematically showing the configuration of a PON system for detecting a fault in an ONT according to a first embodiment of the present invention.

Hereinafter, embodiments of the present invention that can be easily implemented by those skilled in the art will be described in detail with reference to the attached drawings. Further, if in the description the principles of the operation of preferred embodiments, detailed descriptions of well-known functions or configurations may unnecessarily make the gist of the present invention obscure, the detailed descriptions will be omitted.

The same reference numerals are used throughout the different drawings to designate components performing the same or similar functions and operations.

Throughout the entire specification, a representation indicating that a first part is "connected" to a second part includes the case where the first part is "indirectly connected" to the second part with some other element interposed therebetween, as well as the case where the first part is "directly connected" to the second part. Further, a representation indicting that a certain part "includes" a certain element means that other elements may be further included in the certain part without excluding other elements unless a description to the contrary is specifically pointed out.

Hereinafter, embodiments of the present invention will be described in detail with reference to the attached drawings.

FIG. 1 is a diagram schematically showing the configuration of a Passive Optical Network (PON) system for detecting a fault in an Optical Network Terminal (ONT) according to a first embodiment of the present invention. As shown in FIG. 1, the PON system includes a plurality of ONTs 140 which output optical signals in respective sections allocated thereto in a time division access control manner and have at least one virtual ONT, and an Optical Line Terminal (OLT) 100 which receives the optical signals output from the ONTs 140 in the time division access control manner, detects an optical power level in a time slot (section) allocated to the virtual ONT and then determines whether a faulty ONT is present among the ONTs.

Here, the OLT 100 includes at least one Passive Optical Network (PON) module 120 which is configured such that a splitter 130 is used in an optical cable to make a connection to the ONTs 140 so that the plurality of ONTs 140 can be connected to one PON module 120.

Generally, since the OLT 100 performs a communication function, it performs a bidirectional optical transmission function. For example, since in an Ethernet-PON (E-PON), two-way communication is performed over a single optical fiber, a data communication function is performed using optical signals of two different wavelengths of 1490 nm/1310 nm. In such an E-PON, Internet data communication is performed by using 1490 nm as the wavelength of downstream optical signals of data (the output signals of a transmission unit) and by using 1310 nm as the wavelength of upstream optical signals (the input signals of the transmission unit).

Each of the ONTs 140 is allocated a unique Logical Link Identifier (LLID) from the Microcontroller (MCU) 110 of the OLT 100. In this case, a virtual ONT (#V1 ONT) 144 is virtually allocated a virtual LLID (V-LLID). Here, the allocated LLID establishes a logical link between a single ONT and the OLT 100, and rules for specific Service Level Agreement (SLA) are applied to the logical link.

In greater detail, the virtual ONT 144 can be formed at every Nth position of a sequence in which the ONTs 141, 142, and 143 are sequentially arranged. That is, the ONTs can be sequentially arranged in the sequence of #1 ONT, #2 ONT, #3 ONT, #V1 ONT, #5 ONT, #6 ONT, #7 ONT, #V2 ONT, #9 ONT, #10 ONT, #11 ONT, #V3 ONT, . . . . Therefore, #1 ONT, #2 ONT, #3 ONT, and #V1 ONT can be identified as a single group. For example, when 64 ONTs can be connected to a single PON device, the ONTs can be divided into 16 groups, each having a corresponding virtual ONT 144. In this case, the sequence of arrangement of the virtual ONT 144 can be changed if necessary.

Further, time slots are allocated to #1 ONT 141, #2 ONT 142, #3 ONT 143, and #V1 ONT 144 of the ONTs 140 respectively, so that the ONTs 141 to 144 receive optical signals in their time slots, respectively. Each of the ONTs is provided with an optical transmission/reception module and is configured to transmit/receive optical signals to/from the OLT 100 in an up/down stream manner.

Figure 2:
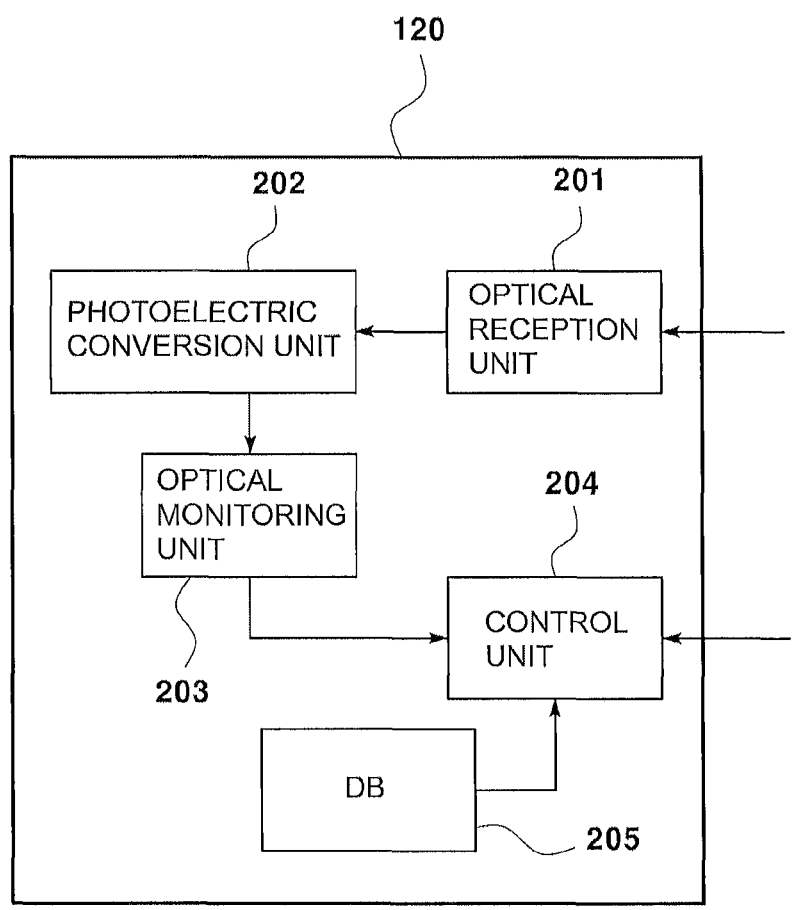
FIG. 2 is a diagram schematically showing the configuration of the PON module of an OLT according to a first embodiment of the present invention.

FIG. 2 is a diagram schematically showing the PON module of the OLT according to a first embodiment of the present invention. As shown in FIG. 2, the PON module 120 includes an optical reception unit 201, a photoelectric conversion unit 202, an optical monitoring unit 203, a database (DB) unit 205, and, a control unit 204.

The optical reception unit 201 receives optical signals from the ONTs 140. Here, the optical reception unit 201 is preferably implemented as a photodiode. The PON module 120 may further include an optical transmission unit (not shown) for transmitting optical signals to the ONTs 140 in an upstream manner. The optical reception unit 201 and the optical transmission unit may be implemented as a single optical transmission/reception module.

The photoelectric conversion unit 202 converts the optical signals received from the optical reception unit 201 into electrical signals.

The optical monitoring unit 203 converts the signals which have been converted into the electrical signals by the photoelectric conversion unit 202, into digital signals, and then detects optical power.

The DB 205 stores data about the ONTs 140. That is, the DB 205 stores data about the unique Logical Link Identifiers (LLIDs), optical power output values, product information, and temperatures of respective ONTs.

The control unit 204 allocates times slots in accordance with the respective time schedules of the ONTs 140, and then determines whether a faulty ONT is present by comparing the optical power data detected by the optical monitoring unit 203 with optical power data stored in the DB unit 205.

In greater detail, the control unit 204 determines whether a faulty ONT is present depending on whether an optical signal has been detected in the time slot allocated to the virtual ONT 144. If the optical power level of an optical signal in the time slot allocated to the virtual ONT V1 144 is equal to or greater than a predetermined value, it is determined that a faulty ONT is present.

Figure 3:
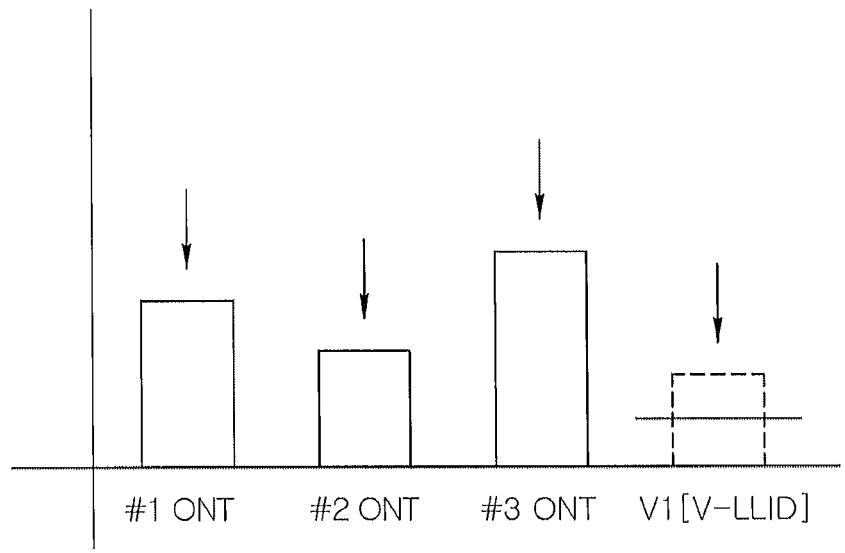
FIG. 3 is a diagram showing the detection of optical power levels in ONT sections and a virtual ONT section according to a first embodiment of the present invention.

FIG. 3 is a diagram showing the detection of optical power levels in ONT sections and a virtual ONT section according to a first embodiment of the present invention. As shown in FIG. 3, the OLT 100 allocates different time slots to #1 ONT, #2 ONT, #3 ONT, and #V1 ONT and receives optical signals therefrom. In this case, a Virtual LLID (V-LLID) is virtually allocated to #V1 ONT.

Figure 4:
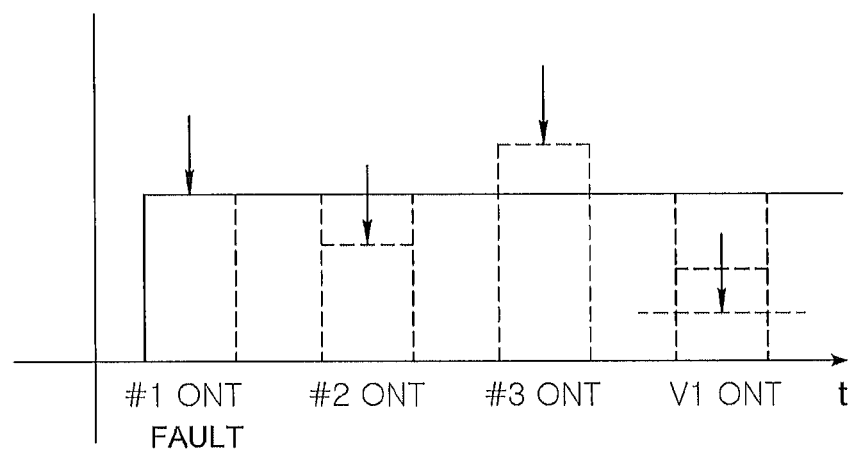
FIG. 4 is a diagram showing the continuous output of an optical signal from a faulty ONT.

FIG. 4 is a diagram showing the continuous output of an optical signal by a faulty ONT. As shown in FIG. 4, when a fault occurs in #1 ONT of #1 ONT, #2 ONT, and #3 ONT, #1 ONT continues to output an optical signal and seizes an optical line. When a laser unit is always turned on regardless of a laser control signal due to the fault in the optical module, when the laser unit of the optical module is always turned on due to the malfunction of a laser control signal of a specific ONT, or when a laser control signal and the control signal input of the optical module are set inversely, a single ONT seizes all upstream time slots, so that the OLT recognizes that all ONTs as well as a faulty ONT did not make accurate responses, and releases all of the registered ONTs, thus interrupting access to an upstream link.

Therefore, the optical power levels of optical signals in the time slots of the ONTs 140 and the time slot of the virtual ONT 144 are detected, and then it is determined whether a faulty ONT is present.

That is, if the optical power level of an optical signal present in the time slot allocated to the virtual ONT V1 is equal to or greater than a predetermined value, it can be determined that the optical signal is being continuously output by the faulty ONT.

Figure 5:
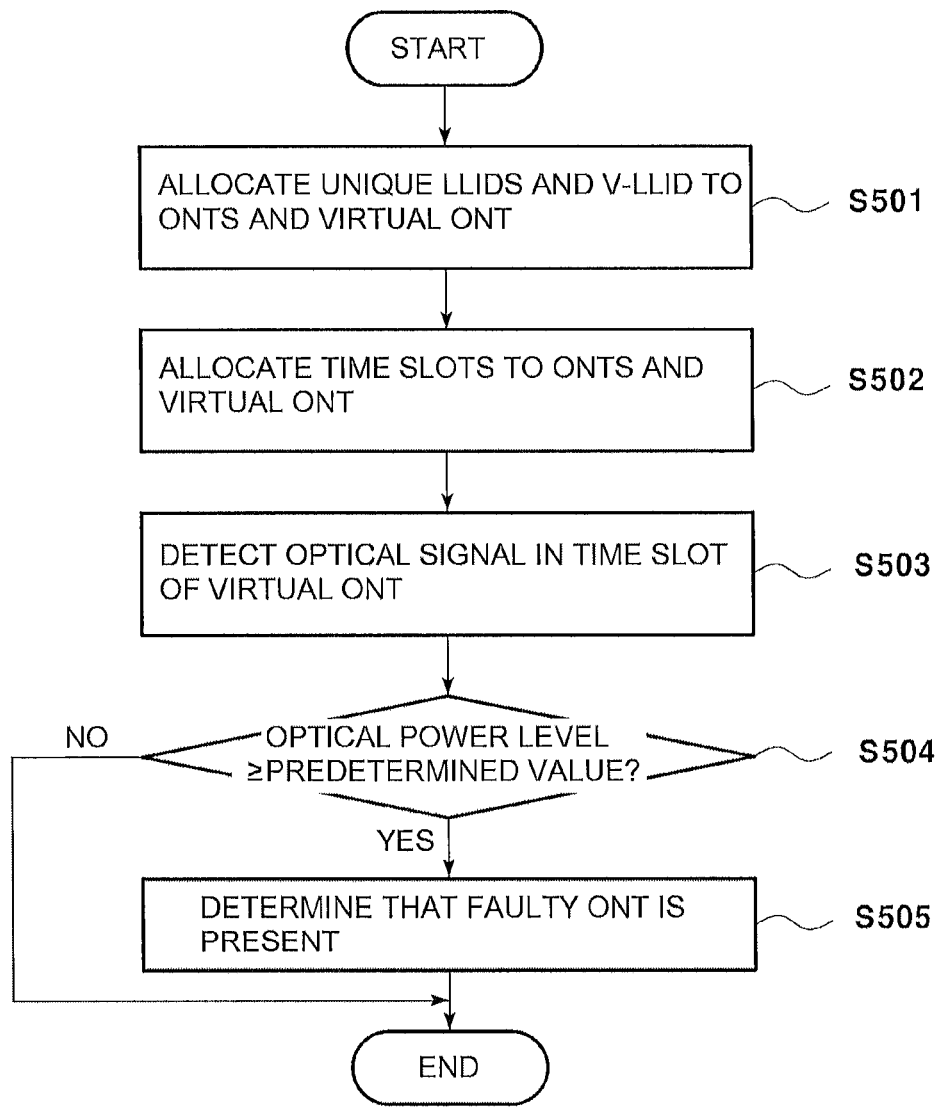
FIG. 5 is a flowchart showing a method for detecting a fault in an ONT in the PON system according to a first embodiment of the present invention.

FIG. 5 is a flowchart showing a method for detecting a fault in an ONT in the PON system according to a first embodiment of the present invention. As shown in FIG. 5, in the method of detecting a fault in an ONT in the PON system according to the present invention, the OLT allocates unique Logical Link IDs (LLIDs) to individual ONTs and at least one virtual ONT at step S501.

Each of the ONTs 140 is allocated a unique LLID from the OLT. In this case, #V1 ONT is virtually allocated a Virtual LLID (V-LLID).

In detail, the virtual ONT can be formed at every Nth position of a sequence in which ONTs are sequentially arranged. For example, the ONTs can be sequentially arranged in the sequence of #1 ONT, #2 ONT, #3 ONT, #V1 ONT, #5 ONT, #6 ONT, #7 ONT, #V2 ONT, #9 ONT, #10 ONT, #11 ONT, #V3 ONT, . . . . When V-LLIDs of virtual ONTs are respectively allocated, #1 ONT, #2 ONT, #3 ONT, and #V1 ONT can be treated as a single group. For example, when 64 ONTs can be connected to a single PON device, the ONTs can be divided into 16 groups, each having a corresponding virtual ONT. In this case, the sequence of arrangement of the virtual ONT can be changed if necessary.

Further, time slots are set for the individual ONTs and the virtual ONT so that optical signals are output from the ONTs and the virtual ONT in a time division access control manner at step S502.

Here, the time slots are allocated to the ONTs and the virtual ONT in accordance with individual time schedules.

Next, an optical signal present in the time slot allocated to each virtual ONT is detected at step S503. That is, optical signals are detected in time slots allocated to the ONTs and the virtual ONT.

Then, if the optical power level of the optical signal detected in the time slot of the virtual ONT is equal to or greater than a predetermined value at step S504, it is determined whether a fault has occurred in any of the ONTs at step S505. Here, data about the detected optical power of the optical signal is compared to the optical power data of the DB unit, so that it is determined whether a faulty ONT is present. The optical power levels of optical signals from the respective ONTs may have predetermined differences, and are compared to previous values stored in the DB. Further, it is determined whether an optical signal has been detected in the time slot allocated to the virtual ONT.

In detail, it is determined whether a faulty ONT is present depending on whether an optical signal has been detected in the time slot allocated to the virtual ONT. If the optical power level of the optical signal in the time slot allocated to the virtual ONT is equal to or greater than a predetermined value, it is determined that a faulty ONT is present. For example, when a fault occurs in any one of #1 ONT, #2 ONT, and #3 ONT, and then the optical signal is being continuously output, a corresponding optical line is seized, so that the optical signal is detected in the time slot allocated to the virtual ONT. That is, the ONTs are determined to be normal only when an optical signal is not detected in the time slot allocated to the virtual ONT.

Figure 6:
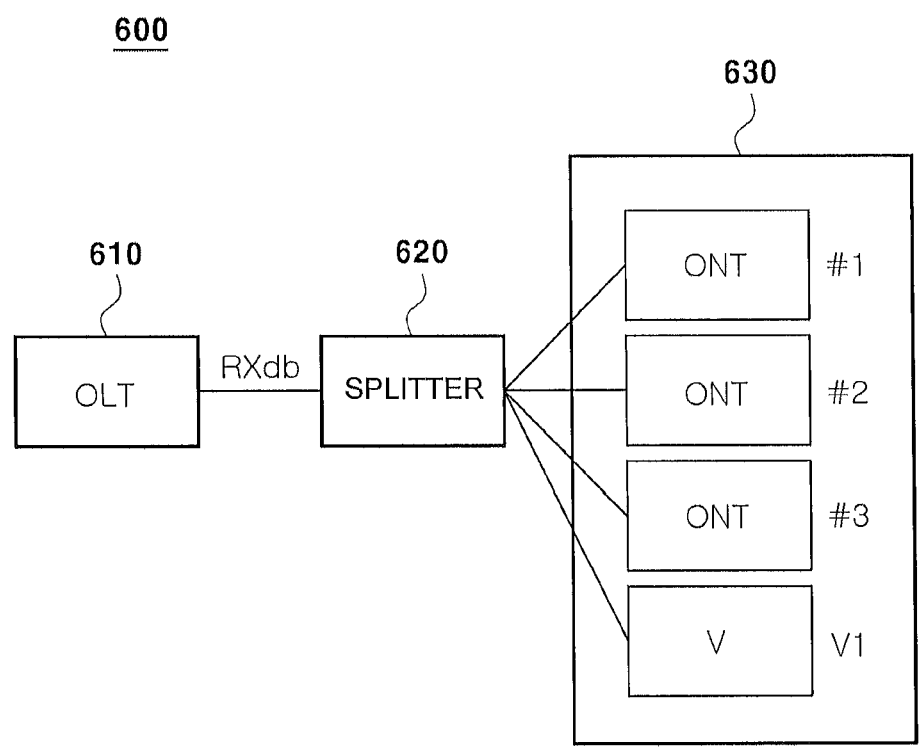
FIG. 6 is a diagram schematically showing the configuration of a PON system according to a second embodiment of the present invention.

FIG. 6 is a diagram schematically showing the configuration of a PON system according to a second embodiment of the present invention. As shown in FIG. 6, the PON system 600 includes a plurality of ONTs 630 which output optical signals in respective time slots allocated thereto in a time division access control manner and have at least one virtual ONT, and an OLT 610 which receives the optical signals from the plurality of ONTs 630, determines whether a LOS signal corresponding to a trigger signal in the time slot of the virtual ONT is present, and then detects a faulty ONT.

The plurality of ONTs and the virtual ONT are sequentially arranged. In this case, the virtual ONT can be formed at every Nth position of a sequence in which the ONTs are sequentially arranged. That is, the ONTs can be sequentially arranged in the sequence of #1 ONT, #2 ONT, #3 ONT, #V1 ONT, #5 ONT, #6 ONT, #7 ONT, #V2 ONT, #9 ONT, #10 ONT, #11 ONT, #V3 ONT, . . . . Therefore, #1 ONT, #2 ONT, #3 ONT, and #V1 ONT can be treated as a single group. For example, when 64 ONTs can be connected to a single PON device, the ONTs can be divided into 16 groups, each having a corresponding virtual ONT. In this case, the sequence of arrangement of the virtual ONT can be changed if necessary. Each ONT is provided with an optical transmission/reception module and is configured to transmit/receive optical signals to/from the OLT in an up/down stream manner.

The OLT 610 includes at least one PON module, which is configured such that a splitter 620 is used in an optical cable to make a connection to the ONTs 630 so that the plurality of ONTs 630 can be connected to one PON module.

Generally, since the OLT 610 performs a communication function, it performs a bidirectional optical transmission function. For example, since, in an E-PON, two-way communication is performed over a single optical fiber, a data communication function is performed using optical signals of two different wavelengths of 1490 nm/1310 nm. In such an E-PON, Internet data communication is performed by using 1490 nm as the wavelength of downstream optical signals of data (the output signals of a transmission unit) and by using 1310 nm as the wavelength of upstream optical signals (the input signals of the transmission unit).

Figure 7:
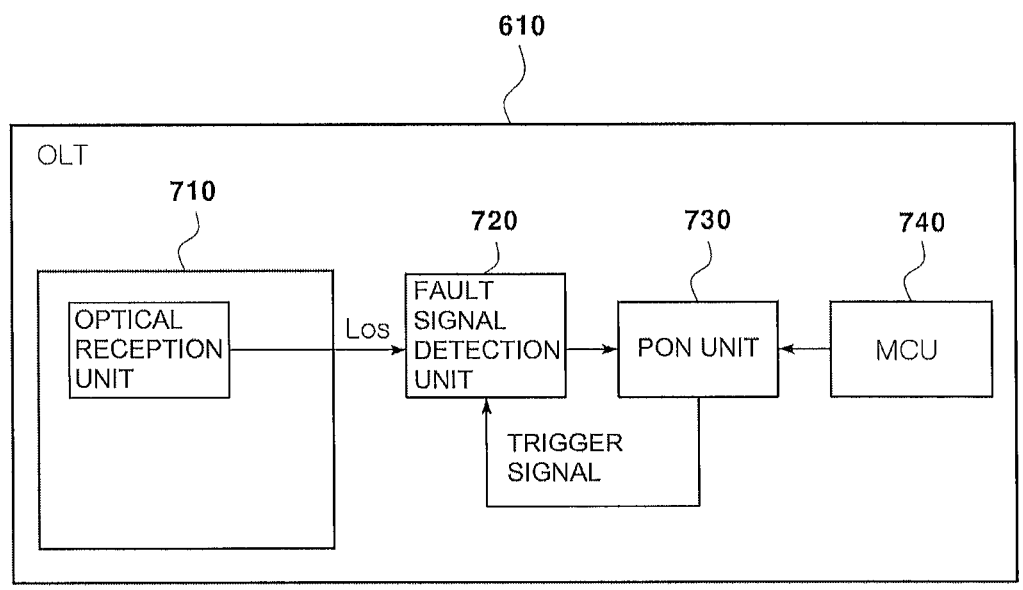
FIG. 7 is a diagram schematically showing the configuration of an OLT according to a second embodiment of the present invention.

FIG. 7 is a diagram schematically showing the configuration of an OLT according to a second embodiment of the present invention. As shown in FIG. 7, the OLT 610 includes an optical reception unit 710, a fault signal detection unit 720, a PON unit 730, and a Microcontroller (MCU) 740.

The MCU 740 allocates unique Logical Link. IDs and a Virtual LLID (V-LLID) to a plurality of ONTs and at least one virtual ONT, respectively. In this case, each allocated LLID establishes a logical link between a single ONT and the OLT, and rules for specific Service Level Agreement (SLA) are applied to the logical link.

Further, the MCU 740 allocates time slots to the ONTs 630 and the virtual ONT, that is, #1 ONT, #2 ONT, #3 ONT, and #V1 ONT.

The optical reception unit 710 receives optical signals from the ONTs and the virtual ONT. Here, the optical reception unit 710 is preferably implemented as a photodiode. The OLT may further include an optical transmission unit (not shown) for transmitting optical signals in an upstream manner to the ONTs 730. The optical reception unit 710 and the optical transmission unit may be implemented as a single optical transmission/reception module.

The fault signal detection unit 720 receives Loss of Signal (LOS) signals, which are the optical signals of the ONTs 630, received from the optical reception unit 710. Here, the LOS signals indicate the output status of optical signals over time. In this case, since the fault signal detection unit 720 cannot determine from which ONT an input LOS signal has been output, it identifies each ONT by receiving a trigger signal from the PON unit 730. Therefore, the fault signal detection unit 720 receives the trigger signal in the time slot of the virtual ONT, and determines whether a LOS signal is present in the time slot corresponding to the trigger signal. In other words, the fault signal detection unit 720 determines the time slot of the virtual ONT in response to the trigger signal applied by the PON unit, and detects a LOS signal in the time slot.

The PON unit 730 applies the trigger signal to the fault signal detection unit 720 in the time slot of the virtual ONT, and determines whether a faulty ONT is present depending on whether a LOS signal has been detected by the fault signal detection unit 720. That is, if a LOS signal has not been detected in the time slot of the virtual ONT, the PON unit 730 determines that the ONTs are normal, whereas if a LOS signal has been detected, the PON unit 730 determines that a faulty ONT is present.

Figure 8:
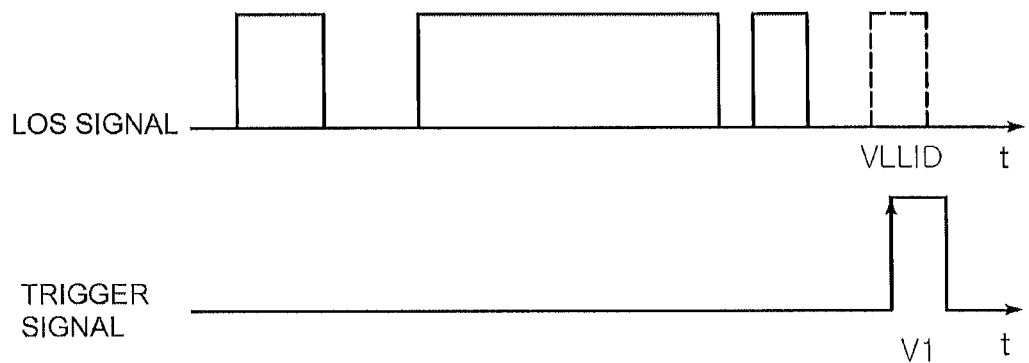
FIG. 8 is a diagram showing the output of a LOS signal corresponding to a trigger signal according to a second embodiment of the present invention.

FIG. 8 is a diagram showing the output of a LOS signal corresponding to a trigger signal according to a second embodiment of the present invention. As shown in FIG. 8, when a trigger signal is applied in the time slot of the virtual ONT, and a LOS signal is not detected in the time slot of the virtual ONT, it is determined that the ONTs are normal, whereas when the LOS signal is detected, it is determined that a faulty ONT is present.

Figure 9:
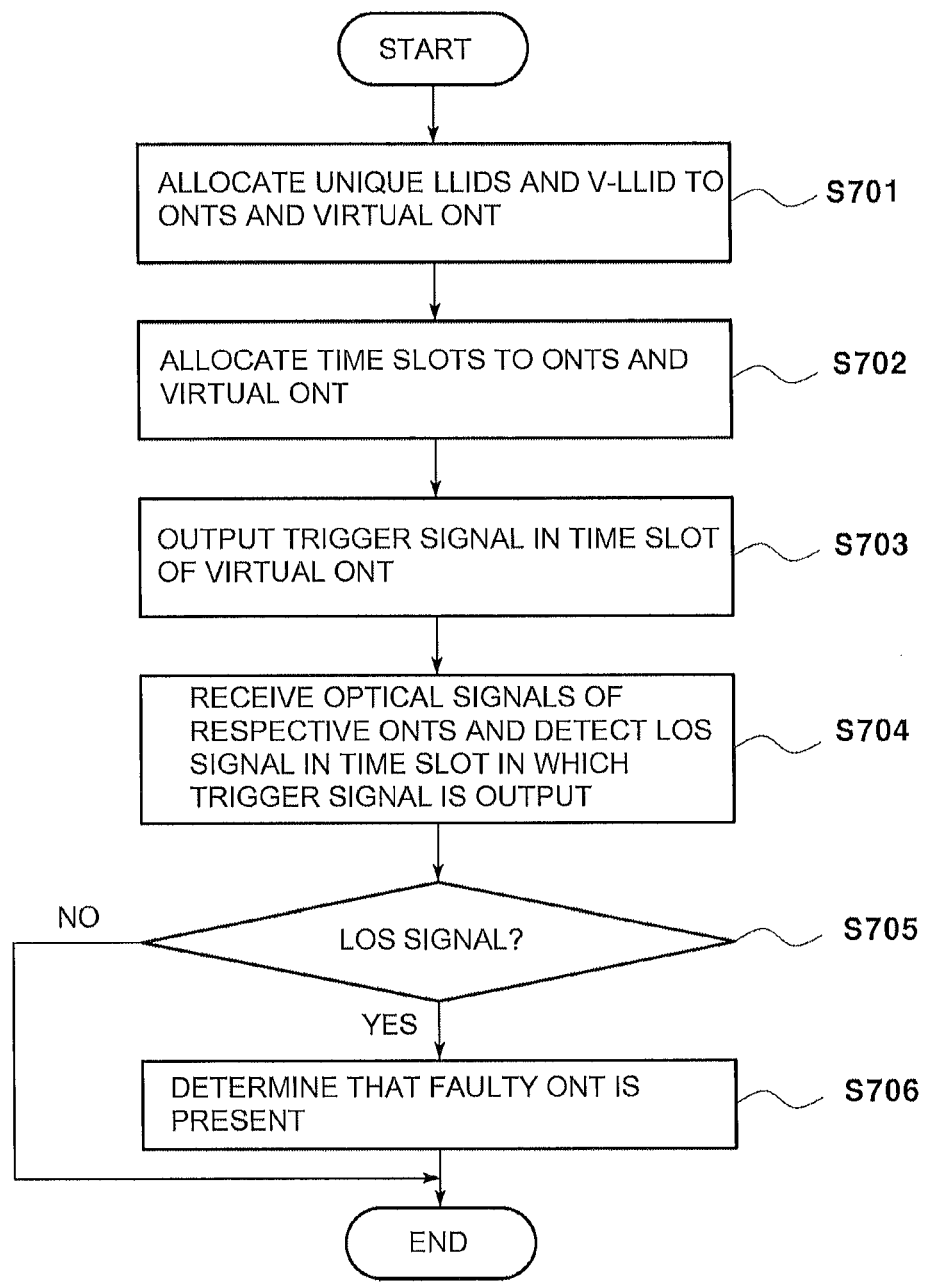
FIG. 9 is a flowchart showing a method for detecting a fault in an ONT in the PON system according to a second embodiment of the present invention.

FIG. 9 is a flowchart showing a method for detecting a fault in an ONT in the PON system according to a second embodiment of the present invention. As shown in FIG. 9, in the method of detecting a fault in an ONT in the PON system, the OLT allocates unique Logical Link IDs (LLIDs) to individual ONTs and at least one virtual ONT at step S701.

Each of the ONTs 630 is allocated a single unique LLID from the OLT. In this case, the virtual ONT #V1, ONT is virtually allocated a Virtual LLID (V-LLID).

In more detail, the virtual ONT can be formed at every Nth position of a sequence in which the ONTs are sequentially arranged. For example, the ONTs can be sequentially arranged in the sequence of #1 ONT, #2 ONT, #3 ONT, #V1 ONT, #5 ONT, #6 ONT, #7 ONT, #V2 ONT, #9 ONT, #10 ONT, #11 ONT, #V3 ONT, . . . . Therefore, if V-LLIDs have been allocated to respective virtual ONTs, #1 ONT, #2 ONT, #3 ONT, and #V1 ONT can be treated as a single group. For example, when 64 ONTs can be connected to a single PON device, the ONTs can be divided into 16 groups, each having a corresponding virtual ONT. In this case, the sequence of arrangement of the virtual ONT can be changed if necessary.

Further, time slots are set for the individual ONTs and the virtual ONT so that optical signals are output from the ONTs and the virtual ONT in a time division access control manner at step S702. Here, the time slots are allocated to the ONTs and the virtual ONT in accordance with respective time schedules.

Next, a trigger signal is applied in the time slot of the virtual ONT at step S703. In greater detail, the PON unit applies the trigger signal to the fault signal detection unit, thus notifying the fault signal detection unit of a time slot in which the optical signal of the virtual ONT is received.

Thereafter, the optical signal in the time slot allocated to the virtual ONT to which the trigger signal is applied is received, and then it is determined whether a LOS signal is present at step S704. That is, optical signals are received in accordance with the time slots respectively allocated to the ONTs and the virtual ONT. In this case, when an optical signal is received from the virtual ONT corresponding to the time slot in which the trigger signal was applied, a LOS signal is generated by the fault signal detection unit. In other words, if a LOS signal for the virtual ONT has been detected at step S705, it is determined that a faulty ONT is present at step S706.

Figure 10:
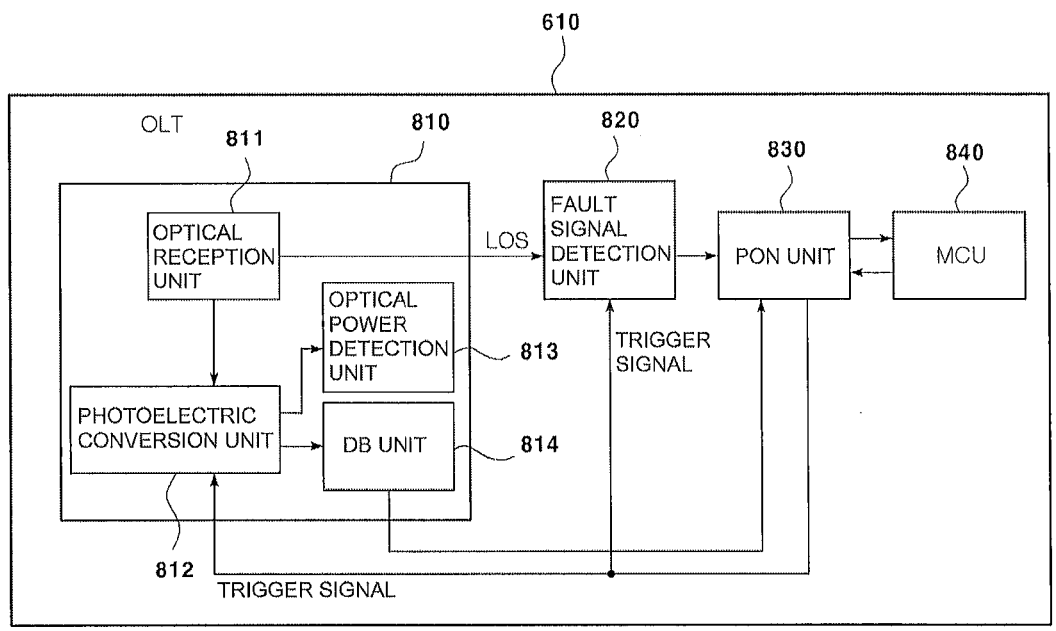
FIG. 10 is a diagram schematically showing the configuration of an OLT according to a third embodiment of the present invention.

FIG. 10 is a diagram schematically showing the configuration of an OLT according to a third embodiment of the present invention. As shown in FIG. 10, the OLT 610 includes an optical module 810 having an optical reception unit 811, a photoelectric conversion unit 812, an optical power detection unit 813, and a DB unit 814, a fault signal detection unit 820, a PON unit 830, and an MCU 840.

The MCU 840 allocates unique Logical Link IDs (LLIDs) and a Virtual Logical Link ID (V-LLID) to a plurality of ONTs and at least one virtual ONT. In this case, each allocated LLID establishes a logical link between a single ONT and the OLT, and rules for specific Service Level Agreement (SLA) are applied to the logical link.

Further, time slots are respectively allocated to the ONTs 630 and the virtual ONT, that is, #1 ONT, #2 ONT, #3 ONT, and #V1 ONT.

The optical reception unit 811 receives optical signals from the ONTs and the virtual ONT. Here, the optical reception unit 811 is preferably implemented as a photodiode. The optical module 810 may further include an optical transmission unit (not shown) for transmitting optical signals to the ONTs 630 in an upstream manner. The optical reception unit 811 and the optical transmission unit may be implemented as a single optical transmission/reception module.

The photoelectric conversion unit 812 converts the optical signals received from the optical reception unit 811 into electrical signals.

The optical power detection unit 813 converts the signals, converted into the electrical signals by the photoelectric conversion unit 812, into digital signals, and detects the optical power levels of the ONTs and the virtual ONT in response to a trigger signal applied by the PON unit 830.

The DB 814 stores data about the optical power levels of the ONTs 630 detected by the optical power detection unit 813. That is, the DB 814 stores data such as the unique LLIDs, optical power output values, product information, and temperatures of the respective ONTs.

The fault signal detection unit 820 receives LOS signals, which are optical signals of the ONTs received from the optical reception unit 811. Here, the LOS signals indicate the output status of optical signals over time. In this case, since the fault signal detection unit 820 cannot determine from which ONT an input LOS signal has been output, it identifies each ONT by receiving a trigger signal from the PON unit 830. Therefore, the fault signal detection unit 820 receives the trigger signal in the time slot of the virtual ONT, and determines whether a LOS signal is present in the corresponding time slot. In other words, the fault signal detection unit 820 determines the time slot of the virtual ONT in response to the trigger signal input from the PON unit 830, and detects a LOS signal in the time slot.

The PON unit 830 applies the trigger signal to the fault signal detection unit 820 in the time slot of the virtual ONT, and determines whether a faulty ONT is present depending on whether a LOS signal has been detected by the fault signal detection unit 820. That is, if a LOS signal has not been detected in the time slot of the virtual ONT, the PON unit 830 determines that the ONTs are normal, whereas if a LOS signal has been detected, the PON unit 830 determines that a faulty ONT is present.

Further, the PON unit 830 applies a trigger signal corresponding to the respective time slots of the ONTs 630 to the photoelectric conversion unit, receives data about the optical power levels of the ONTs 630, and then determines whether a faulty ONT is present.

In greater detail, the PON unit 830 determines whether a faulty ONT is present depending on whether an optical signal has been detected in the time slot allocated to the virtual ONT. If the optical power level of the optical signal in the time slot allocated to the virtual ONT V1 is equal to or greater than a predetermined value, it is determined that a faulty ONT is present.

That is, the PON unit 830 determines based on the optical power levels whether a faulty ONT is present while determining whether a faulty ONT is present by detecting a LOS signal using the fault signal detection unit 820 in the time slot of the virtual ONT. Therefore, it can be more accurately determined whether a faulty ONT is present.

Figure 11:
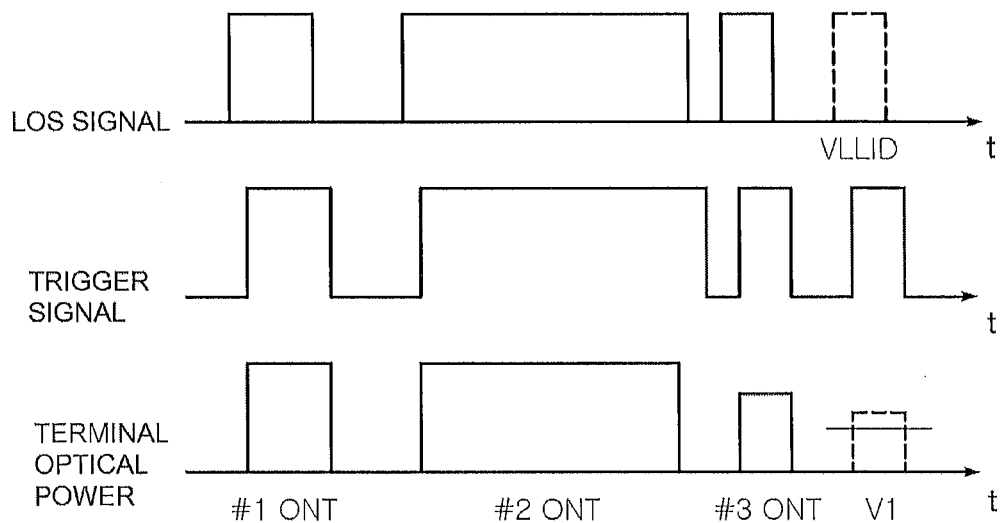
FIG. 11 is a diagram showing LOS signals and optical power levels depending on trigger signals appearing in ONT sections and a virtual ONT section according to a third embodiment of the present invention.

FIG. 11 is a diagram showing LOS signals and optical power levels depending on trigger signals appearing in ONT sections and a virtual ONT section according to a third embodiment of the present invention. As shown in FIG. 11, the PON unit 830 applies a trigger signal to the photoelectric conversion unit 812 and the fault signal detection unit 820. In this case, a time point at which the trigger signal is to be applied corresponds to the time slot of each ONT. Therefore, when the optical signal is received in the case where the trigger signal is applied, a LOS signal is output. Here, if the LOS signal is output in response to the trigger signal applied in the time slot of the virtual ONT, it is determined that a faulty ONT is present.

Further, the optical power levels of the optical signals are detected in the time slots of the ONTs 630 and the time slot of the virtual ONT, and then it is determined whether a faulty ONT is present. That is, if the optical power level of the optical signal in the time slot allocated to the virtual ONT V1 is equal to or greater than a predetermined value, it can be determined that the output of the optical signal from a faulty ONT continues.

Therefore, if the LOS signal has been detected in the time slot of the virtual ONT or if the optical power level of the optical signal has been detected as a value equal to or greater than a predetermined value, it is determined that a fault PON is present.

Figure 12:
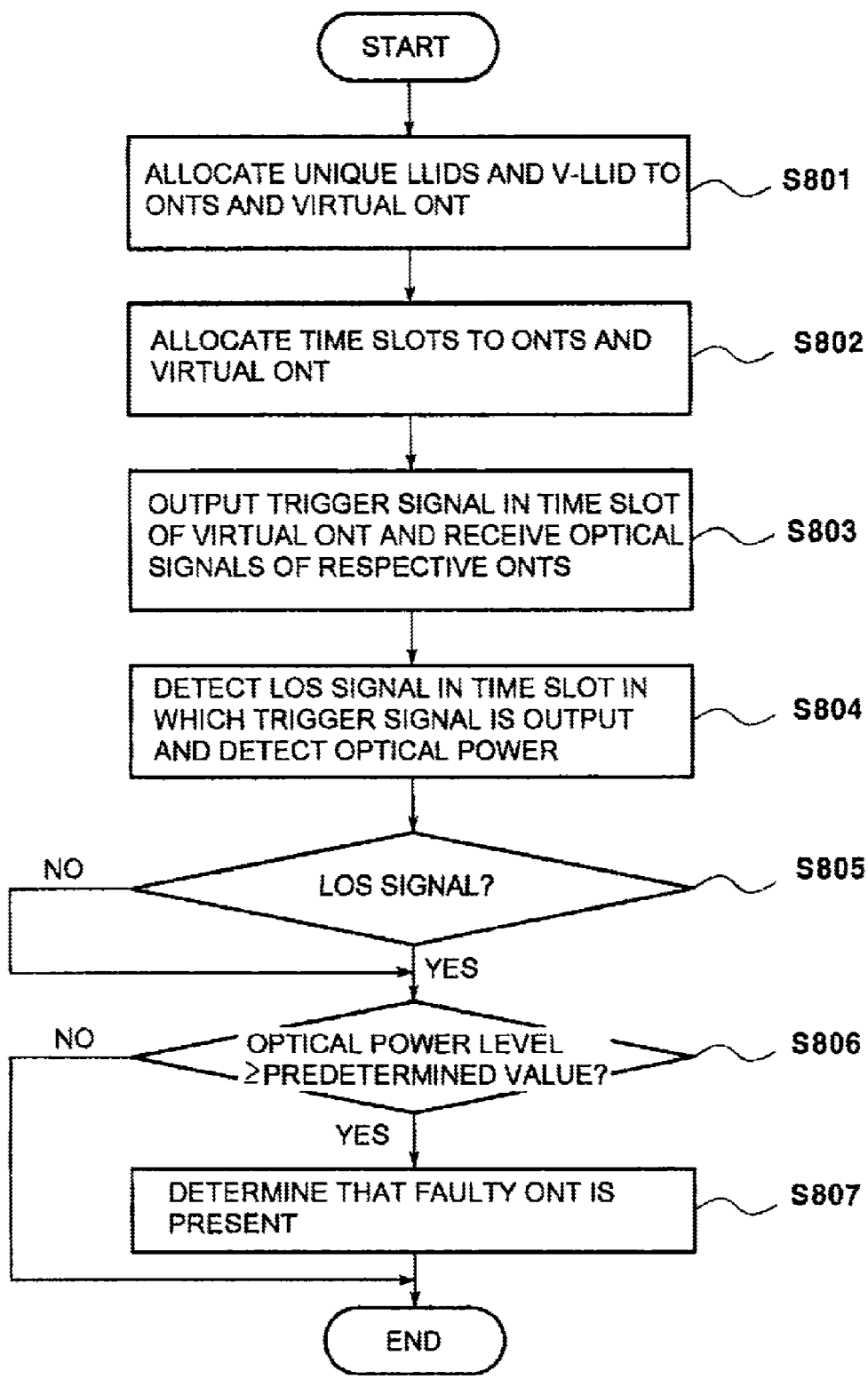
FIG. 12 is a flowchart showing a method for detecting a fault in an ONT in the PON system according to a third embodiment of the present invention.

FIG. 12 is a flowchart showing a method for detecting a fault in an ONT in the PON system according to a third embodiment of the present invention. As shown in FIG. 12, in the method of detecting a fault in an ONT in the PON system according to the present invention, the OLT allocates unique LLIDs to individual ONTs and at least one virtual ONT at step S801.

Each of the ONTs 630 is allocated a single unique LLID from the OLT. In this case, #V1 ONT is virtually allocated a V-LLID.

In more detail, the virtual ONT can be formed at every Nth position of a sequence in which the ONTs are sequentially arranged. For example, the ONTs can be sequentially arranged in the sequence of #1 ONT, #2 ONT, #3 ONT, #V1 ONT, #5 ONT, #6 ONT, #7 ONT, #V2 ONT, #9 ONT, #10 ONT, #11 ONT, #V3 ONT, . . . . Therefore, if V-LLIDs have been allocated to respective virtual ONTs, #1 ONT, #2 ONT, #3 ONT, and #V1 ONT can be treated as a single group. For example, when 64 ONTs can be connected to a single PON device, the ONTs can be divided into 16 groups, each having a corresponding virtual ONT. In this case, the sequence of arrangement of the virtual ONT can be changed if necessary.

Further, time slots are set for the individual ONTs and the virtual ONT so that optical signals are output from the ONTs and the virtual ONT in a time division access control manner at step S802.

Here, the time slots are allocated to the ONTs and the virtual ONT in accordance with respective time schedules.

Next, a trigger signal is applied in the time slots allocated to the ONTs and the virtual ONT at step S803. In greater detail, the PON unit applies the trigger signal to the fault signal detection unit, thus notifying the fault signal detection unit of the time slot in which an optical signal is received from the virtual ONT.

Next, the optical signal is received in the time slot allocated to the virtual ONT to which the trigger signal is applied, and then it is determined whether a LOS signal is present at step S804. That is, optical signals are received in corresponding time slots respectively allocated to the ONTs and the virtual ONT. In this case, when an optical signal is received from the virtual ONT corresponding to the time slot in which the trigger signal was applied, a LOS signal is generated by the fault signal detection unit.

In other words, when a LOS signal for the virtual ONT is detected at step S805, it is determined that a faulty ONT is present.

Then, if an optical power level detected in the time slot of the virtual ONT is equal to or greater than a predetermined value at step S806, it is determined that a fault ONT is present among the ONTs at step S807.

In greater detail, the received optical signals are converted into electrical signals, the electrical signals are converted into digital signals, the optical power levels of the ONTs and the virtual ONT are detected in response to the applied trigger signal, and data about the detected optical power levels of the ONTs and the virtual ONT is stored.

Here, it is determined whether the detected optical power level data of the optical signals is compared with the optical power level data of the DB, and then it is determined whether a faulty ONT is present. The optical power levels of optical signals of the respective ONTs may differ from one another by a predetermined value, and are compared with values previously stored in the DB. Further, it is determined whether an optical signal has been detected in the time slot allocated to the virtual ONT.

In detail, it is determined whether a faulty ONT is present depending on whether an optical signal has been detected in the time slot allocated to the virtual ONT. When the optical power level of the optical signal in the time slot allocated to the virtual ONT is equal to or greater than a predetermined value, it is determined that a faulty ONT is present. For example, when a fault occurs in any one of #1 ONT, #2 ONT, and #3 ONT, and an optical signal is being continuously output, the continuous optical signal seizes an optical line, so that the optical signal is detected in the time slot assigned to the virtual ONT. That is, the ONTs are determined to be normal only when an optical signal is not detected in the time slot allocated to the virtual ONT.

According to the present invention, a faulty ONT that continuously outputs signals can be detected and action can be rapidly taken against system faults when a virtual ONT is formed in a plurality of ONTs connected to an OLT and then an optical signal in the section of the virtual ONT is detected, thus providing a reliable service.

Further, the present invention is configured such that a virtual ONT is formed in a plurality of ONTs connected to an OLT, and such that a trigger signal is applied in the section of the virtual ONT and a LOS signal corresponding to the trigger signal is detected, so that whether a faulty ONT is present can be determined and action can be rapidly taken against system faults, thus providing a stable service.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, the scope of the present invention should not be limited by the above-described embodiments and should be defined by the accompanying claims and equivalents thereof.

What is claimed is:

1. A Passive Optical Network (PON) system, comprising:
   a plurality of Optical Network Terminals (ONTs) for outputting optical signals in time slots allocated thereto in a time division access control manner and having at least one virtual ONT; and
   an Optical Line Terminal (OLT) for receiving the optical signals output from the plurality of ONTs in the time division access control manner, and detecting an optical power level in a time slot allocated to the virtual ONT, thus determining whether a faulty ONT is present, wherein the OLT comprises:
   a Microcontroller (MCU) for allocating unique Logical Link Identifiers (LLIDs) and a Virtual Logical Link ID (V-LLID) to the plurality of ONTs and the virtual ONT, respectively;
   an optical reception unit for receiving the optical signals from the ONTs;
   a photoelectric conversion unit for converting the optical signals received from the optical reception unit into electrical signals;
   an optical monitoring unit for converting the signals, which have been converted into the electrical signals by the photoelectric conversion unit, into digital signals, and then detecting optical power;
   a database (DB) unit for storing data about optical power of the ONTs; and
   a control unit for allocating time slots in accordance with respective time schedules of the ONTs, comparing the optical power data detected by the optical monitoring unit with the optical power data of the DB unit, and then determining whether a faulty ONT is present.

2. The PON system according to claim 1, wherein the control unit determines whether a faulty ONT is present depending on whether an optical signal has been detected in the time slot allocated to the virtual ONT.

3. The PON system according to claim 2, wherein if an optical power level of the optical signal detected in the time slot allocated to the virtual ONT is equal to or greater than a predetermined value, it is determined that a faulty ONT is present.

4. A Passive Optical Network (PON) system, comprising:
   a plurality of Optical Network Terminals (ONTs) for outputting optical signals in time slots allocated thereto in a time division access control manner and having at least one virtual ONT; and
   an Optical Line Terminal (OLT) for receiving the optical signals output from the plurality of ONTs, and determining whether a Loss Of Signal (LOS) signal corresponding to a trigger signal in a time slot of the virtual ONT is present, thus detecting whether a faulty ONT is present, wherein the OLT comprises:
   a Microcontroller (MCU) for allocating unique Logical Link Identifiers (LLIDs) and a Virtual Logical Link ID (V-LLID) to the plurality of ONTs and the virtual ONT, respectively;
   an optical reception unit for receiving the optical signals from the ONTs and the virtual ONT;
   a fault signal detection unit for determining whether a Loss of Signal (LOS) signal is present in the time slot of the virtual ONT; and
   a PON unit for applying a trigger signal to the fault signal detection unit in the time slot of the virtual ONT, and determining whether a faulty ONT is present depending on whether the LOS signal has been detected by the fault signal detection unit.

5. The PON system according to claim 4, wherein the fault signal detection unit determines the time slot of the virtual ONT in response to the trigger signal applied by the PON unit.

6. The PON system according to claim 4, wherein the PON unit determines that a faulty ONT is present if the LOS signal has been detected by the fault signal detection unit, and determines that the ONTs are normal if the LOS signal has not been detected.

7. The PON system according to claim 4, wherein the PON unit determines that a faulty ONT is present if an optical power level of the virtual ONT detected by an optical power detection unit is equal to or greater than a predetermined value.

8. The PON system according to claim 4, further comprising:
   a photoelectric conversion unit for converting the optical signals received from the optical reception unit into electrical signals;
   an optical power detection unit for converting the signals, which have been converted into the electrical signals by the photoelectric conversion unit, into digital signals, and detecting optical power levels of the ONTs and the virtual ONT in response to the trigger signal applied by the PON unit; and
   a database (DB) unit for storing data about the optical power levels of the ONTs and the virtual ONT detected by the optical power detection unit.

9. A method for detecting a fault in an Optical Network Terminal (ONT) in a Passive Optical Network (PON) system, comprising:
   allocating unique Logical Link Identifiers (LLIDs) and a Virtual LLID (V-LLID) to a plurality of ONTs and at least one virtual ONT, respectively;
   setting time slots for the individual ONTs and the virtual ONT so that optical signals are output from the ONTs and the virtual ONT in a time-division access control manner;
   applying a trigger signal in the time slot of the virtual ONT;
   receiving optical signals from the ONTs and the virtual ONT, and detecting whether a Loss of Signal (LOS) signal is present in the time slot in which the trigger signal has been applied; and
   determining that a faulty ONT is present among the ONTs if the LOS signal has been detected,
   converting the received optical signals into electrical signals;
   converting the electrical signals into digital signals and detecting optical power levels of the ONTs and the virtual ONT in response to the applied trigger signal;
   storing data about the detected optical power levels of the ONTs and the virtual ONT; and
   determining that a faulty ONT is present if the detected optical power level of the virtual ONT is equal to or greater than a predetermined value.

10. The method according to claim 9, further comprising detecting LOS signals of the ONTs and the virtual ONT in response to the applied trigger signal.

\* \* \* \* \*